United States Patent Office 2,886,550
Patented May 12, 1959

2,886,550

PROCESS FOR COMPOUNDING RUBBERY POLYMERS WITH HYDROCARBON EXTENDED AND MODIFIED CLAY AND PRODUCT OBTAINED

Mayer B. Goren, Oklahoma City, Okla., assignor to Kerr-McGee Oil Industries, Inc., a corporation of Delaware No Drawing. Application May 24, 1956
Serial No. 586,917

8 Claims. (Cl. 260—33.6)

This invention relates to improved reinforced elastomers and the process of compounding the same. More particularly the present invention relates to reinforced elastomers of improved pigmenting response, i. e., lighter colored reinforced elastomer products.

U.S. Patents 2,531,396 and 2,697,699 incorporate modified clays in rubber for the purpose of producing reinforced elastomers. These reinforced elastomers have proved exceptionally useful products. However, for certain uses they have an inherent disadvantage owing to the darkness of their color. The reinforced elastomer has been found to be dark in color and therefore unsuitable for light colored rubber goods. In addition, they respond poorly to pigmentation.

In accordance with the present invention, the color of these reinforced elastomers as well as the pigmentation response may be improved by a newly discovered method of incorporating the modified clays in the rubber. This method of incorporating the modified clays in the rubber involves the use of a non-staining organic medium which is compatible with rubber as a vehicle or coating for the modified clay.

The clays which are useful as starting materials to provide the modified clays for use in this invention are those exhibiting substantial base-exchange properties and containing cations capable of more or less easy replacement. The term "clay" as used herein, including the claims, includes montmorillonite, viz, sodium, potassium, lithium and other bentonites, particularly of the Wyoming type; magnesium bentonite, sometimes called hectorite and saponite; montronite and attapulgite, particularly that of the Georgia-Florida type; and halloysite. These clays, characterized by an unbalanced crystal lattice, are believed to have negative charges which are normally neutralized by inorganic cations. As found in nature, they exist as salts of the weak clay-acid with bases such as the alkali- or alkaline-earth metal hydroxides. The swelling bentonites of the Wyoming type and the swelling magnesium bentonites of the hectorite type are particularly useful.

The base-exchange capacities of the various clays enumerated above run from a low of about 10 to a high of about 100, based upon milliequivalents of exchangeable base per 100 grams of clay. Generally speaking, those clays which have a high base-exchange capacity are most useful in the present invention. Montmorillonites, attapulgite and halloysite have base-exchange capacities of 100-60, 35-25, 15-6, respectively.

The replacement of the above mentioned cationic groups of base-exchanging clays by basic organic amines and salts thereof has been recognized and this replacement is sometimes referred to as a "base-exchange" reaction. The preparation of such onium-clay combination is disclosed in U.S. Patent 2,033,856.

These base-exchange reactions proceed, in all probability, by means of displacement of the mentioned inorganic cations by organic cations as follows:

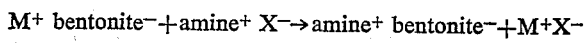

In this reaction, M represents replaceable inorganic base such as the alkali and alkaline-earth metals, e.g., sodium, potassium, calcium, etc., as well as hydrogen and X represents the anion of the amine salt such as chloride or acetate and the like.

An "onium" compound has been defined in Hackh's Chemical Dictionary, second edition, as: "A group of organic compounds of the type RXH which are isologs of ammonium and contain the element X in its highest positive valency, viz, where X is pentavalent as in ammonium, phosphonium, arsonium and stibonium; where X is tetravalent as in oxonium, sulfonium, siliconium and stannonium compounds and where X is trivalent as in iodonium; and that they may be considered as addition compounds of oxonium, carboxium, stibonium, e.g. -inium, -ylium."

A wide variety of elastomer bases are suitable for the purpose of the present invention and, generally stated, any elastomer base which is reinforceable with the modified clays above mentioned may be used. Suitable elastomer bases include natural rubber, butadiene rubber copolymers, polychloroprene rubbers, and isocyanate rubber copolymers. Such elastomer bases may be hereinafter referred to as rubbery polymers.

In accordance with the teachings of U.S. Patents 2,531,396 and 2,697,699 (these teachings being herein incorporated by reference), the above described modified clays are incorporated in rubber latex or preferably in the sheeted rubber. However, it is found that when the modified clay is milled into the coagulated (sheet or baled) rubber, it darkens the finished rubber goods. The present invention, on the other hand, disperses the modified clay into a non-staining rubber-compatible organic medium and then incorporates the resultant dispersion into the rubbery polymer in the usual manner. As a result, the products obtained are considerably lighter in color and much more responsive to pigmentation, physical properties such as hardness, modulus and tensile strength being substantially the same as the corresponding properties of the products produced by the aforesaid patents.

As examples of suitable non-staining rubber-compatible organic mediums there may be mentioned such liquid vehicles as pine oil, light lubricating oils, petroleum naphthas, etc., "Circosol 2XH," a light lubricating oil fully described in "Rubber Age," vol. 70, No. 6, pp. 735–747, March 1952, and the proprietary product of Sun Oil Company and other similar rubber-compatible mineral oils or waxes having non-rubber staining properties prove exceptionally effective in accordance with the present invention. Oils known to the art as "non-staining rubber extending oils" are also very effective.

Generally stated and in accordance with the illustrative embodiments of this invention, the process of compounding the reinforced elastomer is carried out by dispersing the modified clay in the non-staining rubber-compatible organic medium and then the resultant dispersion is milled or banburyed with the rubbery polymer in accordance with usual rubber compounding techniques. It will of course be understood that other compounding materials such as vulcanizing agents, accelerators of vulcanization, other elastomers, softeners, and reinforcing fillers may be compounded with the elastomer base at the time of compounding this base with the modified clay dispersed in the non-staining rubber extending oil or relatively volatile hydrocarbon.

Preferably not more than 25 parts by weight of non-staining rubber-compatible organic medium are used for each 100 parts by weight of rubbery polymer. When greater amounts are employed, it is found that the properties of the rubber may be adversely affected. Normal usage is about 7.5 to 12.5 parts by weight of non-staining rubber-compatible organic medium per 100 parts by weight of rubber and 25 parts by weight should not be exceeded in most instances. Another way of stating the foregoing limitation is that the amount of non-staining rubber-compatible organic medium employed should be no greater than that normally tolerated when a rubber extender oil is used solely as an extender of the rubbery polymer.

The above limitation as to the amount of non-staining rubber-compatible organic medium employed does not necessarily apply to the light relatively volatile hydrocarbons since the hydrocarbon may be largely evaporated from the final rubber product after milling with the rubbery polymer. Thus the resulting rubber product may be rendered essentially free of the hydrocarbon, if desired. However, the quantity of light relatively volatile hydrocarbon used preferably should be sufficient to form a paste to thin slurry with the modified clay and then this paste or thin slurry is milled with the rubbery polymer in the usual manner. The presently preferred ratio of modified clay to light relatively volatile hydrocarbon is about 2:1 by weight.

From 1 to about 20 parts by weight of non-staining rubber-compatible organic medium are preferably employed for each 100 parts by weight of modified clay for the purpose of dispersing the clay therein prior to incorporation in the rubbery polymer. An amount within this range is found sufficient to provide for the necessary dispersion of the modified clay in the organic medium in order to improve the color of the reinforced elastomer as well as its pigmenting response.

The present invention may be further illustrated by the following specific example.

*Example*

Several compositions were compounded as follows with all parts being by weight unless otherwise noted:

| | |
|---|---|
| 41° F. GR–S elastomer | 100 |
| Zinc oxide | 3 |
| Sulfur | 1.75 |
| Stearic acid | 1 |
| Flexamine | 1 |
| Circo-para | 5 |
| Santocure (N - cyclohexyl - 2 - benzothiazole sulfenamide) | 2.6 |

Various fillers were added to the above as follows:

| | |
|---|---|
| Modified clay | 72 |
| 2 parts modified clay—1 part naphtha paste | 150 |
| McNamee clay | 72 |
| Zinc oxide | 166 |
| Philblack A | 50 |

The above compositions were milled in accordance with usual rubber compounding techniques and then cured at 307° F. for a period of about 30 minutes. Physical properties imparted to 41° F. GR–S elastomer by the different fillers are as follows:

80° F.

| Filler | Compression Set, Percent | 300% Modulus, p.s.i. | Tensile, p.s.i. | Elongation | Appearance |
|---|---|---|---|---|---|
| Modified Clay | 21.9 | 300 | 1,180 | 770 | Dark to Black. |
| Modified Clay Naphtha Paste. | 21.8 | 310 | 1,180 | 775 | Light to tan. |
| McNamee Clay | 16.3 | 400 | 700 | 590 | Light. |
| Zinc Oxide | 18.8 | 300 | 750 | 585 | Light. |
| Phil-black A | 16.6 | 1,450 | 2,750 | 505 | Black. |

The above table clearly demonstrates improvement in color of the rubber when modified clay-naphtha paste is substituted for modified clay at the time it is incorporated in the rubber. The resulting light to tan rubber is also more readily pigmented than the dark to black rubber. It may also be noted that other desirable physical properties are not adversely affected.

The composition of various proprietary products disclosed herein are well known to the art and adequately described in numerous prior publications. In every instance each proprietary product is fully described in either the U.S. patents mentioned herein, the well known text "Rubber Red Book—Directory of the Rubber Industry," or "Rubber Age," vol. 70, No. 6, pages 735–747, March 1952. For example, "Flexamine" is an antioxidant reported to be a brown powder consisting of 65% of a complex diaryl amine ketone reaction product and 35% of N,N' diphenyl-p-phenylene diamine; Circo-para is a plasticizer consisting of 50% Circosol 2XH and 50% of a darker petroleum oil; and Philblack A is carbon black.

The foregoing description of the present invention is for the purposes of illustration only and is not limiting to the scope thereof which is set forth in the claims.

What is claimed is:

1. A reinforced rubbery polymer comprising a rubbery polymer selected from the class consisting of natural rubber, polybutadiene, polychloroprene, polyisoprene, copolymers of butadiene and styrene, copolymers of butadiene and acrylonitrile, copolymers of isobutene and isoprene, and copolymers of isobutene and butadiene, and a modified clay originally exhibiting a base-exchange capacity in which the inorganic cation has been replaced by a substituted organic onium base, the modified clay prior to its incorporation in the rubbery polymer being dispersed in a non-staining rubbery polymer-compatible hydrocarbon which is liquid at the temperature of incorporation of the modified clay in the rubbery polymer.

2. The reinforced rubbery polymer of claim 1 wherein the amount of the non-staining rubbery polymer-compatible hydrocarbon used is not more than about 25 parts by weight per 100 parts by weight of the rubbery polymer.

3. The reinforced rubbery polymer of claim 1 wherein for each 100 parts by weight of the modified clay there are from about 1 to 20 parts by weight of non-staining rubbery polymer-compatible hydrocarbon.

4. The reinforced rubbery polymer of claim 1 wherein the modified clay is modified bentonite.

5. A process for preparing a reinforced rubbery polymer comprising the steps of incorporating a modified clay originally exhibiting a base-exchange capacity in which the cation has been replaced by a substituted organic onium base with a non-staining rubbery polymer-compatible hydrocarbon, and compounding the modified clay incorporated with the non-staining rubbery polymer compatible hydrocarbon with a rubbery polymer selected from the class consisting of natural rubber, polybutadiene, polychloroprene, polyisoprene, copolymers of butadiene and styrene, copolymers of butadiene and acrylonitrile, copolymers of isobutene and isoprene, and copolymers of isobutene and butadiene to produce a reinforced rubbery polymer, the rubbery polymer-compatible hydrocarbon being liquid at the temperature at which the modified clay is compounded with the rubbery polymer.

6. The process of claim 5 wherein from about 1 to 20 parts by weight of the non-staining rubbery polymer-compatible hydrocarbon are employed for each 100 parts by weight of the modified clay.

7. The process of claim 5 wherein not more than 25 parts by weight of the non-staining rubbery polymer-compatible hydrocarbon are employed for each 100 parts by weight of the rubbery polymer.

8. The process of claim 5 wherein the modified clay is modified bentonite.

References Cited in the file of this patent

UNITED STATES PATENTS

| | | |
|---|---|---|
| 2,440,299 | Rostler et al. | Apr. 27, 1948 |
| 2,531,396 | Carter et al. | Nov. 28, 1950 |
| 2,697,699 | Cohn | Dec. 21, 1954 |